Figure 1:
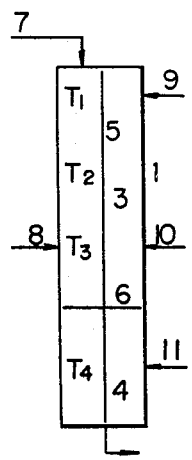

United States Patent [19]  
Nakai et al.

[11] 4,085,266  
[45] Apr. 18, 1978

[54] PROCESS FOR THE HIGH PRESSURE PRODUCTION OF POLYETHYLENE

[75] Inventors: Setsuo Nakai; Shinichiro Kita; Fumihiko Hiki; Masayuki Shimizu, all of Niihama, Japan

[73] Assignee: Sumitomo Chemical Company, Limited, Osaka, Japan

[21] Appl. No.: 805,908

[22] Filed: Jun. 13, 1977

[30] Foreign Application Priority Data

Jun. 29, 1976 Japan ................................. 51-77300

[51] Int. Cl.$^2$ ........................... C08F 2/02; C08F 4/32; C08F 110/02
[52] U.S. Cl. ........................................ 526/65; 526/73; 526/88; 526/352
[58] Field of Search ............................. 526/65, 73, 88

[56] References Cited

U.S. PATENT DOCUMENTS

| | | | |
|---|---|---|---|
| 3,178,404 | 4/1965 | Vaughn, Jr. et al. | 526/73 |
| 3,692,763 | 9/1972 | Van Saane et al. | 526/88 |
| 3,756,996 | 9/1973 | Pugh et al. | 526/65 |
| 3,875,128 | 4/1975 | Suzuki et al. | 526/73 |
| 3,923,767 | 12/1975 | Kellum et al. | 526/65 |
| 3,963,690 | 6/1976 | Pruitt et al. | 526/88 |

FOREIGN PATENT DOCUMENTS 676,159 12/1963 Canada ................................. 526/73

Primary Examiner—Alan Holler  
Attorney, Agent, or Firm—Stevens, Davis, Miller & Mosher

[57] ABSTRACT

In a process for polymerizing ethylene in a two-zone autoclave reactor comprising a top reaction zone and a bottom reaction zone which process comprises polymerizing ethylene in said top reaction zone at 130° to 200° C and at a reaction pressure of 1,000 to 1,800 kg/cm$^2$ using an initiator, sending the resulting reaction mixture from the top reaction zone to the bottom reaction zone, and further promoting the polymerization at 220° to 280° C using an initiator which is same as or different from the initiator in the top reaction zone, the improvement which comprises feeding 75% or more of the ethylene to the top reaction zone of the two-zone reactor, said two-zone reactor being constructed so that the volume ratio of top reaction zone to bottom reaction zone is 1.5 to 6 and being provided with two or more feed inlets for each of the ethylene and the initiator in the top reaction zone in the direction extending through the two reaction zones.

6 Claims, 6 Drawing Figures

U.S. Patent April 18, 1978 4,085,266

PROCESS FOR THE HIGH PRESSURE PRODUCTION OF POLYETHYLENE

The present invention relates to a process for producing a low-density polyethylene having improved optical properties and processabilities.

More particularly, it relates to a process for polymerizing ethylene by the high pressure process using a two-zone autoclave reactor comprising a top reaction zone and a bottom reaction zone.

Polyethylene is produced commercially by various processes, and polyethylenes having distinct properties are commercially available. These different types of polyethylene are usually classified by the density of the polymer into the so-called low-density polyethylene, medium-density polyethylene and high-density polyethylene. Among them, the low-density polyethylene having a density within the range of 0.900 to 0.935 g/cm³ is widely used in the fields of film and packaging. The low-density polyethylene used in these fields are particularly required to have excellent optical properties, stiffness and processabilities. As a process for producing a low-density polyethylene having such characteristic properties using a two-zone autoclave reactor, the two-reaction zone process is well known, for example as is disclosed in U.S. Pat. No. 3,536,693, Brit. Pat. No. 1,208,120 and Japanese patent publication No. 20,243/1961. This process comprises polymerizing ethylene in the top reaction zone and bottom reaction zone of different temperatures.

This polymerization process is characterized in that ethylene is polymerized in the top reaction zone and the bottom reaction zone with a reaction temperature difference between them in order to produce the polyethylene having such characteristic properties as mentioned above. In practicing this process, it is general to keep the reaction temperature in the top reaction zone at such a low temperature as about 130° C to about 200° C.

But, this two-reaction zone process has the following drawbacks.

In a high pressure polymerization of ethylene using an autoclave reactor, initiators used have their own optimum temperature at which they exhibit the maximum efficiency as an initiator (the number of moles of ethylene polymerized per 1 mole of initiator).

The present inventors found that the initiator efficiency $\eta$ is nearly represented by the following equation irrespective to the type of initiator when the polymerization temperature is less than the optimum one:

$$\eta \propto \theta_e^{-1/RT(2E_p - E_t)}$$

wherein R is a gas constant (1.987 cal/mole.K), T is a reaction temperature (K), $E_p$ is an activation energy of polymerization reaction (cal/mole), $E_t$ is an activation energy of termination reaction (cal/mole) and $\theta$ is a mean residence time of ethylene in the reactor (sec).

The initiator efficiency increases as an increase in the polymerization temperature along the theoretical curve represented by this equation. But, when the temperature exceeds the optimum one, the efficiency becomes low.

The initiators used in the above-mentioned two-reaction zone process are such that they are active at low temperatures, in other words, have a high decomposition rate at low temperatures, because the reaction temperature in the top reaction zone is low. But, as is illustrated hereinbefore, the efficiency itself of the initiators is necessarily low, even if the activity thereof reaches the maximum at low temperatures.

That the initiator efficiency is low means that the amount of initiator required for producing a definite amount of polyethylene is large.

Consequently, the drawback of the conventional two-reaction zone processes is that the amount of initiator necessary for producing a definite amount of polyethylene is large, which results in a great economical loss.

An object of the present invention is to provide a two-reaction zone process for producing a low-density polyethylene which is improved in the above-mentioned drawbacks, on the basis of the finding that, when ethylene is fed at a definite rate to the reactor having a definite volume, the initiator efficiency is proportional to the mean residence time of the ethylene gas in the reactor. That is to say, the present invention provides a process which is capable of decreasing the amount of initiator required for producing a definite amount of polyethylene.

Another object of the present invention is to provide a process for producing polyethylene which is superior in optical properties and processabilities to the polyethylenes produced by the conventional two-reaction zone processes.

Other objects will become apparent from the following description.

According to the process of this invention, the initiator efficiency is high, a small amount of initiator is enough to produce a definite amount of polyethylene, and the polyethylene produced has excellent optical properties and processabilities, in comparison with the conventional processes. Consequently, the present invention has an extremely large commercial values.

That is to say, in a process for polymerizing ethylene in a two-zone autoclave reactor comprising a top reaction zone and a bottom reaction zone which process comprises polymerizing ethylene in said top reaction zone at 130° to 200° C and at a reaction pressure of 1,000 to 1,800 kg/cm² using an initiator, sending the resulting reaction mixture from the top reaction zone to the bottom reaction zone, and further promoting the polymerization at 220° to 280° C using an initiator which is same as or different from the initiator in the top reaction zone, the present invention provides an improved process which comprises feeding 75% or more of the ethylene to the top reaction zone of the two-zone reactor, said two-zone reactor being constructed so that the volume ratio of top reaction zone to bottom reaction zone is 1.5 to 6 and being provided with two or more feed inlets for each of the ethylene and the initiator in the top reaction zone in the direction extending through the two reaction zones.

Figure 2:
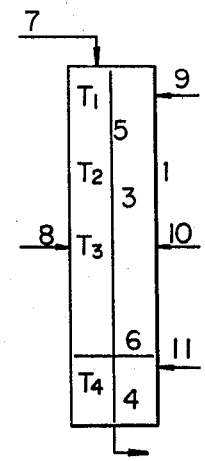
Figure 3:
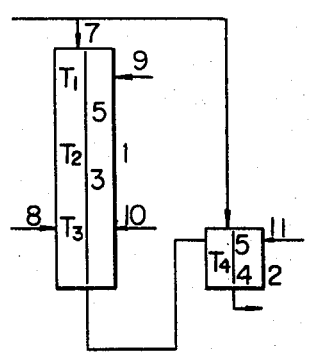
Figure 4:
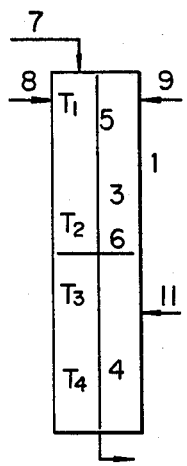
Figure 5:
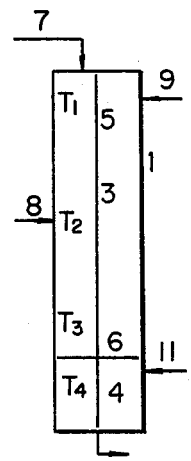
Figure 6:
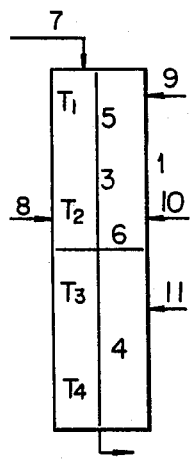

In the accompanying drawings, FIGS. 1, 2 and 3 are schematic diagrams of the preferred forms of reactor used in this invention, and FIGS. 4, 5 and 6 are schematic diagrams of the reactors given for comparison. The meanings of the figures in the drawings are as follows:

1 Autoclave reactor
2 Autoclave reactor
3 Top reaction zone
4 Bottom reaction zone
5 Agitator
6 Baffle
7 and 8 Lines (for feeding ethylene)

9, 10 and 11 Lines (for feeding initiator)

When ethylene is fed to the top reaction zone at a definite rate, the mean residence time of ethylene gas in the top reaction zone becomes longer by using the reactor of this invention having a volume ratio (top reaction zone/bottom reaction zone) of 1.5 to 6 than by using other reactors having the volume ratio of 1. When the reaction temperature is the same, therefore, the initiator efficiency in this invention becomes higher than that in other cases.

On the other hand, the initiator efficiency in the bottom reaction zone becomes of course low, because the mean residence time in the zone becomes short. Since, however, the initiator efficiency in the bottom reaction zone is originally high owing to the high reaction temperatures in the zone, the decrease of initiator efficiency in the zone owing to the short mean residence time is not so serious when the volume ratio of top reaction zone to bottom reaction zone is within the range of 1.5 to 6 as in the reactor of this invention.

Referring to the overall initiator efficiency, an increase in the initiator efficiency in the top reaction zone can sufficiently compensate for a decrease in the initiator efficiency in the bottom reaction zone.

If the increase of initiator efficiency alone is aimed at, however, it can sufficiently be attained, with the conventional reactors having a top reaction zone and a bottom reaction zone of the same volume, by feeding an extremely small portion of ethylene to the top reaction zone and the rest to the bottom reaction zone.

The polyethylene thus obtained has, however, a relatively large amount of the polymer produced in the bottom reaction zone of high temperature. It is therefore difficult to obtain a polyethylene having excellent optical properties and processabilities suitable for the fields of film and packaging.

In order to improve the initiator efficiency over that of the conventional two-reaction zone processes, and, at the same time, to obtain a polyethylene having excellent optical properties and processabilities which is another object of this invention, it is necessary to feed 75% or more of ethylene to the top reaction zone and at the same time to provide the zone with two or more feed inlets for each of the ethylene and the initiator in the direction extending through the two reaction zones.

Japanese patent publication No. 14,258/1971 discloses a high pressure polymerization process of ethylene in the single-reaction zone using an autoclave reactor which is provided with a plural number of feed inlets for each of an ethylene and a radical initiator. But, even though this process is applied to the conventional two-reaction zone processes using a reactor having a top reaction zone and a bottom reaction zone of the same volume, the improvement of initiator efficiency is impossible, and moreover the physical properties and processabilities of the resulting polyethylene are also much inferior to those of the polyethylene of this invention.

It is very surprising that the polyethylenes of this invention have physical properties and processabilities much superior to those of the polyethylenes produced by the conventional two-reaction zone processes.

The present invention will be illustrated in more detail.

In practicing the present invention, an autoclave reactor having a substantially cylindrical form or nearly cylindrical form is used and the ratio of length to diameter of the reactor is 2 to 20, preferably 5 to 15. Ethylene is polymerized in a top reaction zone and a bottom reaction zone kept at different temperatures from each other, using an initiator. One such process can be conducted in a single autoclave reactor having two reaction zones partitioned by a baffle (partition plate) or other partition means.

Another such process can be conducted by connecting two autoclave reactors in series and carrying out separate reactions in the two reactors. In conducting this process, a pressure control valve may be mounted on the line connecting the top reactor with the bottom reactor.

In the present invention, the volume ratio of top reaction zone to bottom reaction zone is 1.5 to 6, preferably 2 to 5.

When the volume ratio is less than 1.5, the mean residence time in the top reaction zone is not much extended, so that the improvement of initiator efficiency in the zone cannot be much expected.

The larger the volume ratio is, the more improved the initiator efficiency is. But the volume ratio cannot be increased infinitely in the polymerization of ethylene using an autoclave reactor.

In the polymerization of ethylene, a polymerization heat of about 800 cal/g is generated and this heat is used for making up for the temperature difference between the reaction mixture coming out of the reactor and the cold ethylene coming into the reactor.

In other words, this polymerization of ethylene proceeds according to the so-called auto-thermal reaction wherein the polymerization heat generated is almost equal to the amount of heat required for elevating the cold ethylene to the reaction temperature.

Consequently, when the ethylene is fed at a definite rate, a too large volume ratio of top reaction zone to bottom reaction zone is not proper for the following reasons: The mean residence time in the bottom reaction zone become necessarily too short to generate an amount of polymerization heat enough to elevate the ethylene coming into the bottom reaction zone (speaking more correctly, the reaction mixture of about 130° C to about 200° C produced in the top reaction zone) to the required reaction temperature in the bottom reaction zone. Accordingly, the required reaction temperature cannot be reached in the bottom reaction zone.

When the reactor has a limited volume, therefore, the volume ratio of top reaction zone to bottom reaction zone is also limited naturally.

The upper limit of the volume ratio cannot be determined unconditionally, because it depends chiefly upon the reaction temperature of the bottom reaction zone, the type of initiator, the volume of reactor and the feed rate of ethylene. But, by considering the feed rate of ethylene and the volume of autoclave reactor which are now employed in the production of polyethylene, the upper limit is 6.

This applies as well to the case where two autoclave reactors are connected in series.

In practicing the present invention, the initiator and the ethylene can be fed to the reactor at the same inlet or different ones.

The positions of the inlets at which the initiator and the ethylene are fed to the top reaction zone can be combined in many ways. In order to obtain the polyethylene of this invention having superior optical properties and processabilities to those of other polyethylenes, however, the positions of the inlets should be combined so as to make the distribution of reaction temperature in the top reaction zone as uniform as possible. Such combinations as above can easily be determined by the skilled in the art.

The reaction temperature can be controlled, for example, by feeding the initiator by an automatic control system so that required positions in the autoclave reactor keep the desired temperatures.

Even with the two-zone reactors having a volume ratio (top reaction zone/between reaction zone) of 1.5 to 6, the same results as in the present invention cannot always be obtained. For example, when the top reaction zone has one feed inlet for each of the initiator and the ethylene, or it has one feed inlet for the initiator and two feed inlets for the ethylene, the polyethylene obtained is inferior to that of this invention in optical properties and processabilities, even though the positions of these feed inlets are determined so as to make the distribution of reaction temperature in the zone as uniform as possible. At present, the reasons for such lowering of these properties are not clear.

In the process of this invention, 75% or more of the ethylene is fed to the top reaction zone and the rest is fed to the bottom reaction zone. When the amount fed to the bottom reaction zone exceeds 25%, the quality of polyethylene is damaged as is described hereinbefore. It is desirable to feed all of said ethylene to the top reaction zone.

In the present invention, the followng ranges of the reaction pressure and reaction temperature are desirable to obtain a polyethylene having excellent optical properties and processabiliteis. The pressure range is 1,000 to 1,800 kg/cm$^2$, preferably 1,100 to 1,600 kg/cm$^2$, for both the top and the bottom reaction zones and the temperature range is 130° to 200° C, preferably 150° to 180° C, for the top reaction zone and 220° to 280° C, preferably 230° to 270° C, for the bottom reaction zone.

As the initiator used in the top reaction zone, such radical initiators that are decomposed at 40° to 80° C to obtain a half-life period of 10 hours, are desirable. The specific examples include diisopropyl peroxydicarbonate, di-2-ethylhexyl peroxydicarbonate, tert-butyl peroxypivalate, 3,5,5-trimethylhexanoyl peroxide, octanoyl peroxide, decanoyl peroxide, lauroyl peroxide, propionyl peroxide, tert-butyl peroxy-2-ethylhexanoate, tert-butyl peroxyisobutyrate and the like.

In the top reaction zone, the amount of initiator to be used for the polymerization of ethylene is generally 100 to 1,000 parts by weight based on 1,000,000 parts by weight of ethylene.

As the initiator used in the bottom reaction zone, such radical initiators that are decomposed at 70° to 140° C to obtain a half-life period of 10 hours are desirable. The specific examples include tert-butyl peroxy-2-ethylhexanoate, tert-butyl peroxyisobutyrate, tert-butyl peroxylaurate, tert-butyl peroxyisopropylcarbonate, tert-butyl peroxyacetate, tert-butyl peroxybenzoate, dicumyl peroxide, tert-butyl hydroperoxide, di-tert-butyl peroxide and the like.

In the bottom reaction zone, the amount of initiator to be used for the polymerization of ethylene is generally 5 to 500 parts by weight based on 1,000,000 parts by weight of ethylene.

When the foregoing initiators are fed to the top reaction zone or to the bottom reaction zone, they can be used alone or in mixtures in the common amounts to be used.

Ethylene used in the present invention can generally contain a chain transfer agent of 0.1 to 10 mole % based on the ethylene.

As the chain transfer agent, paraffins (e.g. ethane, propane, butane, pentane, hexane, heptane), α-olefins (e.g. propylene, butene-1, hexene-1, 3-methylpentene-1), aldehydes (e.g. formaldehyde, acetaldehyde, propionaldehyde), ketones (e.g. acetone, methyl ethyl ketone, diethyl ketone, cyclohexanone), aromatic hydrocarbons (e.g. benzene, toluene, xylene) and the like are used alone or in mixtures.

According to the process of this invention, polyethylenes of high commercial value having excellent optical properties and processabilities can be produced at a low cost with great economical and commerical advantages.

The process of this invention can be applied not only to the production of ethylene homopolymers, but also to the production of copolymers of ethylene and other comonomers, for example, ethylene-vinyl acetate, ethylene-methyl acrylate, ethylene-ethyl acrylate, and ethylene-styrene copolymers.

The present invention will be illustrated specifically with reference to the following examples and comparative examples, but the present invention is not limited to these examples.

EXAMPLES 1 to 5 and Comparative Examples 1 to 5

FIGS. 1, 2 and 3 are the schematic diagrams of the preferred forms of reactor used in this invention. FIG. 3 is an example wherein two autoclave reactors are connected in series by means of piping 5. FIGS. 4, 5 and 6 are the schematic diagrams of the reactors given for comparison. The figures attached to the equipments and lines shown in FIGS. 1 to 6 are common to all the drawings. The same figures mean the same equipments or lines. $T_1$ to $T_4$ in each drawing are positions at which the reaction temperatures are measured.

In each drawing, there are shown the feed inlets for ethylene and initiator, the positions at which the reaction temperatures are measured, and a relative position of the baffle in the direction extending through the two reaction zones.

In each drawing, the positions of the feed inlets for ethylene and initiator are combined in the most desirable manner than gives a uniform distribution of reaction temperature.

Reactor 1 (in FIGS. 1, 2, 4, 5 and 6) is partitioned into top reaction zone 3 and bottom reaction zone 4 by baffle 6. The reactor is provided with an agitator 5 driven by a motor (not shown), and the shaft of agitator 5 is provided with paddle blades (not shown) and baffle 6.

Ethylene was compressed to the reaction pressure and fed to top reaction zone 3 via lines 7 and 8. Initiator was fed to the top reaction zone via lines 9 and 10 thereby to keep the temperatures of the required positions in the zone at the required ones.

The initiator was fed to the bottom reaction zone via line 11 thereby to keep the temperatures of the required positions in the zone at the required ones. The positions at which the reaction temperature is controlled, and the temperatures thereat are as shown in the table.

Polyethylene and unreacted ethylene were introduced into a usual separator from the bottom of the reactor through a pressure reducing valve mounted on the bottom. The polyethylene was separated and the unreacted ethylene was compressed and recycled to the reactor. The flow sheet of this process is not shown in the drawings.

Of the physical properties of the polyethylenes thus obtained, the density was measured according to ASTM D-1505, the melt index according to ASTM D-1238, the haze according to ASTM D-1003, the gloss according to ASTM D-523 and D-2103.

The smaller the value of haze and the larger the value of gloss is, the more superior the optical properties of the film is.

The property to be formable into thin film (the so-called "draw-down") is shown by the minimum film thickness (unit $\mu$) which can be reached when the polyethylenes are formed into film at 160° C. The smaller the film thickness is, the more superior the draw-down property is.

Superiority of the present invention is apparent from the comparison with Comparative examples. The results of Examples 1 to 5 and Comparative examples 1 to 5 are shown in the table. Comparative examples 1 and 3 are a modification of Example 1. Comparative example 2 is a modification of Example 2. Comparative example 4 is a modification of Example 4. Comparative example 5 is an example illustrating that the optical properties of polyethylene become poor at a reaction pressure of 1,800 kg/cm$_2$.

Comparative Example 6

Ethylene containing 3 mole % of propylene was compressed to a reaction pressure of 1,100 kg/cm$_2$ and fed to the top reaction zone at a rate of 44 kg/hr, using a two-zone reactor having a volume ratio (top reaction zone/bottom reaction zone) of 7. 3,5,5-Trimethylhexanoyl peroxide was fed to the top reaction zone at a rate of 18 g/hr and the ethylene was polymerized at 170° C. The reaction mixture produced in the top reaction zone was introduced into the bottom reaction zone and a further polymerization was tried by feeding di-tert-butyl peroxide. But, the reaction mixture could not reach the required reaction temperature of 260° C, and therefore the polymerization operation was stopped.

Table

| | | Example 1 |
|---|---|---|
| Schematic diagram of reactor | | FIG. 1 |
| Volume ratio | top reaction zone / bottom reaction zone | 2 |
| Feed rate of ethylene (kg/hr) | via line 7 | 44 |
| | via line 8 | 44 |
| Mean residence time (sec) | top reaction zone / bottom reaction zone | 49/23 |
| Chain transfer agent | Type | ethane |
| | Concentration (mole %) | 1.1 |
| Reaction pressure (kg/cm$^2$) | | 1200 |
| Reaction temperature (° C) | top reaction zone T$_2$ | 170 |
| | top reaction zone T$_3$ | 170 |
| | bottom reaction zone T$_4$ | 260 |
| Radical initiator | top reaction zone (via lines 9, 10) | 3,5,5-trimethyl hexanoyl peroxide |
| | amount fed (g/hr) | 28 |
| | bottom reaction zone (via line 11) | di-tert-butyl peroxide |
| | amount fed (g/hr) | 2.2 |
| Production rate of polyethylene (kg/hr) | | 15.1 |
| Properties | Density (g/cm$^3$) | 0.923 |
| | Melt index (g/10 min) | 1.5 |
| | Optical properties Haza (%) | 3.3 |
| | Gross (%) | 120 |
| | Draw-down property ($\mu$) | 14 |

| | Example 2 | Comparative example 1 | Comparative example 2 | Comparative example 3 |
|---|---|---|---|---|
| | FIG. 2 | FIG. 4 | FIG. 5 | FIG. 6 |
| | 4 | 1 | 4 | 1 |
| | 44 | 44 | 44 | 44 |
| | 44 | 44 | 44 | 44 |
| | 59/14 | 36/34 | 59/14 | 36/34 |
| | ethane | ethane | ethane | ethane |
| | 4.2 | 0.7 | 2.8 | 0.8 |
| | 1200 | 1200 | 1200 | 1200 |
| | 170 | 170 | 170 | 170 |
| | 170 | | | 170 |
| | 260 | 260 | 260 | 260 |
| | 3,5,5-trimethyl hexanoyl peroxide | | | |
| | 20 | 36 | 24 | 34 |
| | di-tert-butyl peroxide | | | |
| | 3.0 | 36 | 24 | 34 |
| | 15.2 | 1.3 | 2.8 | 1.4 |
| | 0.923 | 15.1 | 15.1 | 15.1 |
| | 1.5 | 0.923 | 0.923 | 0.923 |
| | 2.9 | 1.5 | 1.5 | 1.5 |
| | 130 | 5.6 | 5.2 | 5.0 |
| | 13 | 100 | 100 | 100 |
| | | 22 | 20 | 20 |

| | Example 3 | Example 4 | Comparative example 4 | Example 5 | Comparative example 5 |
|---|---|---|---|---|---|
| | FIG. 1 | FIG. 2 | FIG. 4 | FIG. 3 | FIG. 1 |
| | 2 | 4 | 1 | 4 | 2 |
| | 44 | 44 | 44 | 40 | 44 |
| | 44 | 44 | 44 | 44 | 44 |
| | 51/24 | 61/14 | 38/34 | 74/17 | 54/26 |
| | propane | ethane | ethane | propylene | propane |
| | 4.0 | 4.5 | 2.7 | 1.1 | 6.9 |
| | 1350 | 1400 | 1400 | 1200 | 1800 |
| | 165 | 170 | 170 | 170 | 170 |
| | 165 | 170 | | 170 | 170 |
| | 240 | 265 | 265 | 260 | 260 |
| | octanoyl peroxide | 265 | 265 | 3,5,5-trimethyl hexanoyl peroxide | 260 |
| | 20 | 14 | 24 | 17 | 10 |
| | tert-butyl peroxy-benzoate | di-tert-butyl peroxide | 24 | 17 | 10 |
| | 2.0 | 1.8 | 0.6 | 2.5 | 0.8 |
| | 11.3 | 15.5 | 15.4 | 15.7 | 15.3 |
| | 0.926 | 0.923 | 0.923 | 0.922 | 0.927 |
| | 2 | 0.3 | 0.3 | 2 | 1.5 |
| | 3.1 | 3.6 | 6.3 | 3.5 | 6.8 |
| | 140 | 110 | 90 | 120 | 85 |
| | 13 | 20 | 32 | 14 | 17 |

What is claimed is:

1. In a process for polymerizing ethylene in a two-zone autoclave reactor comprising a top reaction zone and a bottom reaction zone which process comprises polymerizing ethylene in said top reaction zone at 130° to 200° C and at a reaction pressure of 1,000 to 1,800 kg/cm$^2$ using an initiator, sending the resulting reaction mixture from the top reaction zone to the bottom reaction zone, and further promoting the polymerization at 220° to 280° C using an initiator which is same as or different from the initiator in the top reaction zone, the improvement which comprises feeding 75% or more of the ethylene to the top reaction zone of the two-zone reactor, said two-zone reactor being constructed so that the volume ratio of top reaction zone to bottom reaction zone is 1.5 to 6 and being provided with two or more feed inlets for each of the ethylene and the initiator in the top reaction zone in the direction extending through the two reaction zones.

2. A process according to claim 1, wherein all of said ethylene is fed to the top reaction zone.

3. A process according to claim 1, wherein said volume ratio of top reaction zone to bottom reaction zone of the reactor is 2 to 5.

4. A process according to claim 1, wherein the number of the feed inlets for each of the ethylene and the initiator is two.

5. A process according to claim 1, wherein said two-zone autoclave reactor is a single reactor which is partitioned into the top and bottom reaction zones by a baffle.

6. A process according to claim 1, wherein said two-zone autoclave reactor is composed of two reactors connected in series by means of piping.

* * * * *